United States Patent
Li (10) Patent No.: US 11,368,317 B2
(45) Date of Patent: Jun. 21, 2022

(54) CONSENSUS METHOD OF CONSORTIUM BLOCKCHAIN, AND CONSORTIUM BLOCKCHAIN SYSTEM

(71) Applicant: ALIPAY (HANGZHOU) INFORMATION TECHNOLOGY CO., LTD., Zhejiang (CN)

(72) Inventor: Shuai Li, Hangzhou (CN)

(73) Assignee: ALIPAY (HANGZHOU) INFORMATION TECHNOLOGY CO., LTD., Hangzhou (CN)

(*) Notice: Subject to any disclaimer, the term of this patent is extended or adjusted under 35 U.S.C. 154(b) by 0 days.

(21) Appl. No.: 17/359,581

(22) Filed: Jun. 27, 2021

(65) Prior Publication Data
US 2022/0006655 A1    Jan. 6, 2022

(30) Foreign Application Priority Data
Jul. 3, 2020    (CN) .......................... 202010630328.7

(51) Int. Cl.
G06F 21/00        (2013.01)
H04L 29/06        (2006.01)
(Continued)

(52) U.S. Cl.
CPC .......... H04L 9/3265 (2013.01); H04L 9/0643 (2013.01); H04L 9/3236 (2013.01);
(Continued)

(58) Field of Classification Search
CPC ... H04L 9/3265; H04L 9/0643; H04L 9/3236; H04L 2209/38; H04L 2209/463; H04L 2209/56
See application file for complete search history.

(56) References Cited

U.S. PATENT DOCUMENTS 10,824,601 B1    11/2020   Zhuo
10,928,803 B2    2/2021    Biernat et al.
(Continued)

FOREIGN PATENT DOCUMENTS

CN    109194466 A      1/2019
CN    109345386    *   2/2019
(Continued)

OTHER PUBLICATIONS

Extended European Search Report for European Application No. 21 182 382.8 dated Nov. 19, 2021.
(Continued)

*Primary Examiner* — Lisa C Lewis (57) ABSTRACT

This specification discloses a consensus method of a consortium blockchain and a consortium blockchain system. The method includes: dividing, by a primary consensus node of the consortium blockchain, proposed data into data blocks corresponding to backup consensus nodes of the consortium blockchain based on erasure coding (EC), the data blocks corresponding to hash values calculated based on EC; sending, by the primary consensus node, a first data block to a corresponding backup consensus node, wherein the first data block is forwarded by the corresponding backup consensus node receiving the first data block to one or more other backup consensus nodes; and initiating, by the primary consensus node, a consensus process for the proposed data based on a Practical Byzantine Fault Tolerance (PBFT) protocol to send a hash value of the first data block to the corresponding backup consensus node via a PBFT protocol message.

20 Claims, 2 Drawing Sheets

(51) Int. Cl.
  *H04L 9/32* (2006.01)
  *H04L 9/06* (2006.01)
(52) U.S. Cl.
  CPC .... *H04L 2209/38* (2013.01); *H04L 2209/463* (2013.01); *H04L 2209/56* (2013.01)

(56) References Cited

U.S. PATENT DOCUMENTS

| | | |
|---|---|---|
| 10,944,567 B2 | 3/2021 | Zhuo |
| 10,977,114 B2 | 4/2021 | Zhou |
| 10,985,919 B2 | 4/2021 | He et al. |
| 11,016,962 B2 | 5/2021 | Zhuo |
| 11,023,309 B2 | 6/2021 | Deng |
| 11,023,314 B2 | 6/2021 | Lu et al. |
| 11,025,410 B2 | 6/2021 | Zhuo |
| 11,032,077 B2 | 6/2021 | Ma et al. |
| 11,032,082 B2 | 6/2021 | Yang |
| 11,050,549 B2 | 6/2021 | Zhang et al. |
| 11,055,712 B2 | 7/2021 | Zhuo |
| 11,057,221 B2 | 7/2021 | Peng |
| 2019/0288993 A1 | 9/2019 | Lin |
| 2020/0028947 A1 | 1/2020 | Yang |
| 2020/0128043 A1* | 4/2020 | Xie ................... H04L 63/1416 |
| 2020/0128044 A1* | 4/2020 | Xie ....................... H04L 63/126 |
| 2020/0394181 A1 | 12/2020 | Winarski |
| 2021/0034455 A1* | 2/2021 | Deng ................... H04L 9/3239 |
| 2021/0109825 A1 | 4/2021 | Liao |
| 2021/0110493 A1 | 4/2021 | Yang |
| 2021/0192512 A1 | 6/2021 | Che |

FOREIGN PATENT DOCUMENTS

| | | |
|---|---|---|
| CN | 109345386 A | 2/2019 |
| CN | 110800258 A | 2/2020 |
| WO | 2020/042792 A1 | 3/2020 |
| WO | 2020098819 A2 | 5/2020 |
| WO | 2020169123 A2 | 8/2020 |

OTHER PUBLICATIONS

Miller et al., "The Honey Badger of BFT Protocols," IACR, International Association for Cryptologic Research, Feb. 28, 2016.
Qi et al., "BFT-Store: Storage Partition for Permissioned Blockchain via Erasure Coding," 2020 IEEE 36th International Conference on Data Engineering, Apr. 20, 2020.
First Search for Chinese Application No. 202010630328.7 dated Aug. 3, 2020.
Supplementary Search for Chinese Application No. 202010630328.7 dated Dec. 17, 2020.

* cited by examiner

CONSENSUS METHOD OF CONSORTIUM BLOCKCHAIN, AND CONSORTIUM BLOCKCHAIN SYSTEM

CROSS-REFERENCE TO RELATED APPLICATIONS

This application claims priority to Chinese Patent Application No. 202010630328.7, filed with the China National Intellectual Property Administration on Jul. 3, 2020. The entire content of the above-identified application is incorporated herein by reference.

TECHNICAL FIELD

This specification relates to the field of consortium blockchain technologies and, in particular, to a consensus method of a consortium blockchain and a consortium blockchain system.

BACKGROUND

Currently, when a consortium blockchain is implemented based on a Practical Byzantine Fault Tolerance (PBFT) algorithm, a primary consensus node needs to send proposed data (a transaction set) to backup consensus nodes before consensus is reached. To ensure fault tolerance in the transmission of the proposed data, the primary consensus node needs to send redundant proposed data. The redundant proposed data cause a consensus mechanism of the PBFT protocol to occupy relatively large network bandwidth and storage space.

Therefore, there is need for an optimized solution of the PBFT protocol, which can effectively reduce network bandwidth and storage space overheads in a consensus process.

SUMMARY

An objective of the embodiments of this specification is to provide a consensus method of a consortium blockchain and a consortium blockchain system, which can reduce network bandwidth and storage space overheads in a consensus process.

To achieve the above objective, the embodiments of this specification are implemented as follows.

In a first aspect, the embodiments of this specification provide a consensus method of a consortium blockchain, comprising: dividing, by a primary consensus node of the consortium blockchain, proposed data into a plurality of data blocks corresponding to a plurality of backup consensus nodes of the consortium blockchain based on erasure coding (EC), wherein the plurality of data blocks correspond to hash values calculated based on EC; sending, by the primary consensus node, a first data block of the plurality of data blocks to a corresponding backup consensus node of the plurality of backup consensus nodes, wherein the first data block is forwarded by the corresponding backup consensus node receiving the first data block to one or more backup consensus nodes of the plurality of backup consensus nodes; and initiating, by the primary consensus node, a consensus process of the proposed data based on a Practical Byzantine Fault Tolerance (PBFT) protocol to send a hash value of the first data block to the corresponding backup consensus node via a PBFT protocol message, wherein a verification on the first data block is performed by the corresponding backup consensus node, based on the hash value of the first data block in the PBFT protocol message, to execute a consensus logic of the PBFT protocol on successfully verified proposed data.

In some embodiments, the primary consensus node sends a root hash value of the first data block to the corresponding backup consensus node of the consortium blockchain via a pre-prepare message in a pre-prepare phase of the PBFT protocol.

In some embodiments, the verification on the obtained first data block is performed based on the hash value of the first data block in the pre-prepare message in the pre-prepare phase or a prepare phase of the PBFT protocol.

In some embodiments, if the verification on the first data block fails, one or more other data blocks of the proposed data verified by one or more other backup consensus nodes of the consortium blockchain is obtained by the corresponding backup consensus node of the consortium blockchain from the one or more other backup consensus nodes, and the consensus logic of the PBFT protocol is executed on the proposed data after the one or more other data blocks are obtained successfully.

In some embodiments, if the corresponding backup consensus node fails to obtain the one or more other data blocks verified by the one or more other backup consensus nodes, a view switching operation is initiated by the corresponding backup consensus node.

In some embodiments, the verification on the first data block is performed by: reconstructing, based on EC, a Merkle tree for the first data block; and if a root hash value of the reconstructed Merkle tree matches the hash value of the first data block in the PBFT protocol message, determining that the verification succeeds, otherwise, determining that the verification fails.

In some embodiments, the plurality of data blocks obtained by dividing the proposed data correspond one-to-one to the plurality of backup consensus nodes of the consortium blockchain; or a number of the plurality of data blocks obtained by dividing the proposed data is less than a number of the plurality of backup consensus nodes of the consortium blockchain, and one backup consensus node corresponds at most to one data block.

In some embodiments, the proposed data comprises one or more transactions from a transaction pool of the primary consensus node, wherein the primary consensus node performs an account validity verification on a transaction initiated by a client and synchronizes a transaction having succeeded in the account validity verification to the transaction pool of the primary consensus node.

In some embodiments, the method further comprises recording, by the corresponding backup consensus node of the consortium blockchain, a serial number of a view of the consensus and a verification result of the proposed data in association with each other.

In a second aspect, the embodiments of the specification provide a system for consensus in a consortium blockchain, which may comprise at least one processor and a memory storing instructions that, when executed by the at least one processor, cause the computing system to perform operations. The operations may include dividing, by a primary consensus node of the consortium blockchain, proposed data into a plurality of data blocks corresponding to a plurality of backup consensus nodes of the consortium blockchain based on erasure coding (EC), wherein the plurality of data blocks correspond to hash values calculated based on EC. The operations may also include sending, by the primary consensus node, a first data block of the plurality of data blocks to a corresponding backup consensus node of the plurality of backup consensus nodes, wherein the first data block is forwarded by the corresponding backup consensus node receiving the first data block to one or more backup consensus nodes of the plurality of backup consensus nodes. The operations may further include initiating, by the primary consensus node, a consensus process of the proposed data based on a Practical Byzantine Fault Tolerance (PBFT) protocol to send a hash value of the first data block to the corresponding backup consensus node via a PBFT protocol message, wherein a verification on the first data block is performed by the corresponding backup consensus node, based on the hash value of the first data block in the PBFT protocol message, to execute a consensus logic of the PBFT protocol on successfully verified proposed data.

In a third aspect, the embodiments of the specification provide a non-transitory computer-readable storage medium including instructions that, when executed by at least one processor of a computing system, cause the computing system to perform operations. The operations may include dividing, by a primary consensus node of the consortium blockchain, proposed data into a plurality of data blocks corresponding to a plurality of backup consensus nodes of the consortium blockchain based on erasure coding (EC), wherein the plurality of data blocks correspond to hash values calculated based on EC. The operations may also include sending, by the primary consensus node, a first data block of the plurality of data blocks to a corresponding backup consensus node of the plurality of backup consensus nodes, wherein the first data block is forwarded by the corresponding backup consensus node receiving the first data block to one or more backup consensus nodes of the plurality of backup consensus nodes. The operations may further include initiating, by the primary consensus node, a consensus process of the proposed data based on a Practical Byzantine Fault Tolerance (PBFT) protocol to send a hash value of the first data block to the corresponding backup consensus node via a PBFT protocol message, wherein a verification on the first data block is performed by the corresponding backup consensus node, based on the hash value of the first data block in the PBFT protocol message, to execute a consensus logic of the PBFT protocol on successfully verified proposed data.

Based on the solutions of the embodiments of this specification, the primary consensus node of the consortium blockchain sends the proposed data by using the EC technology to achieve fault tolerance of the proposed data with relatively low network bandwidth and storage space overheads. In addition, the backup consensus node may perform a verification on the received data block based on EC to determine whether correct proposed data is obtained, thereby avoiding subsequent resource consumption for executing the consensus logic on wrong proposed data, which prevents the proposed data from being maliciously tampered with and then being uploaded to the consortium blockchain, and significantly improves the consensus efficiency.

BRIEF DESCRIPTION OF THE DRAWINGS

To describe the technical solutions in the embodiments of this specification or in existing technologies more clearly, the accompanying drawings required for describing the embodiments or the existing technologies are briefly introduced below. Apparently, the accompanying drawings in the following description show merely some embodiments recorded in the embodiments of this specification, and a person of ordinary skill in the art may still derive other drawings from these accompanying drawings without creative efforts.

DETAILED DESCRIPTION

To enable a person skilled in the art to better understand the technical solutions in this specification, the technical solutions of the embodiments of this specification are described clearly and thoroughly below with reference to the accompanying drawings of the embodiments of this specification. Apparently, the described embodiments are merely some rather than all of the embodiments of this specification. All other embodiments obtained by a person of ordinary skill in the art based on the embodiments of this specification without creative efforts shall fall within the protection scope of this specification.

As described above, under a current consensus mechanism of a PBFT protocol, a primary consensus node needs to send redundant proposed data to backup consensus nodes so that the backup consensus nodes can execute a consensus logic on the proposed data. The redundant proposed data occupies relatively large network bandwidth and storage space. Therefore, this specification provides an optimized solution of the PBFT protocol, which can effectively reduce network bandwidth and storage space overheads during a consensus process and improve resource utilization.

Figure 1:
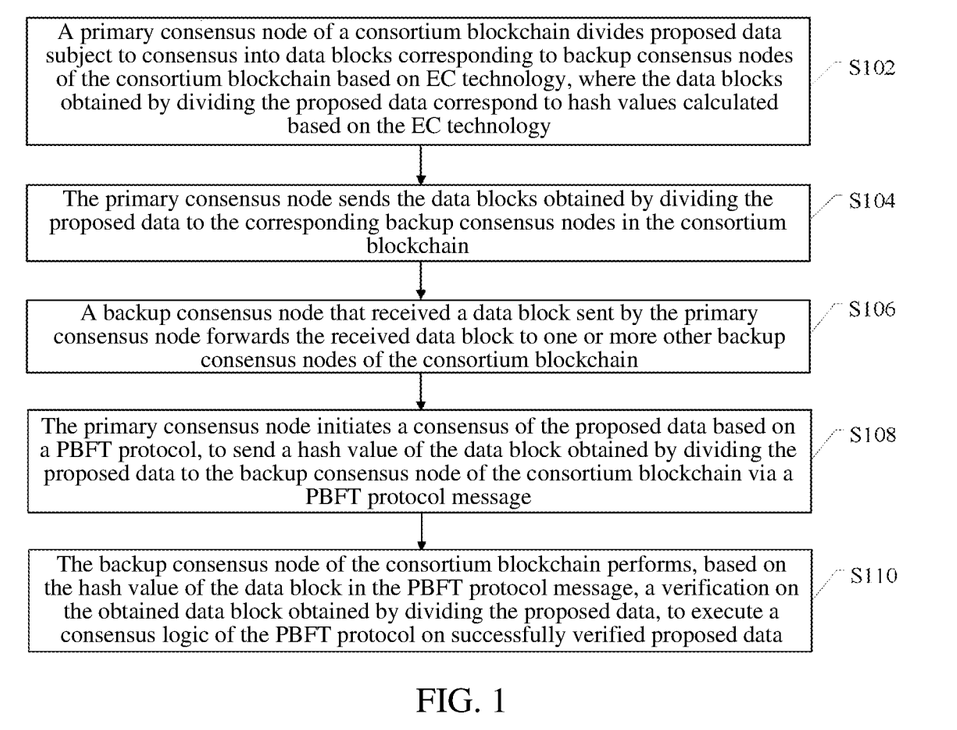
FIG. 1 illustrates a schematic flowchart of a consensus method of a consortium blockchain, in accordance with an embodiment of the disclosure.

FIG. 1 illustrates a schematic flowchart of a consensus method of a consortium blockchain, in accordance with an embodiment of the disclosure. The method in FIG. 1 may be performed by a corresponding apparatus below and includes the following steps.

Step S102: A primary consensus node of the consortium blockchain divides proposed data into a plurality of data blocks corresponding to a plurality of backup consensus nodes of the consortium blockchain based on EC technology. The a plurality of data blocks obtained by dividing the proposed data correspond to hash values calculated based on EC.

Erasure coding (EC) is a data fault-tolerance protection method. in which data is divided into segments, and redundant data blocks are expanded, coded, and stored at different locations, e.g., disks, storage nodes, or other geographic locations. From the perspective of data function, the protection provided by EC can be represented by the following formula: $n=k+m$. The variable k represents the value of original data or an original symbol. The variable m represents the value of an additional or redundant symbol added for providing protection after a fault. The variable n represents a total value of symbols created after the EC process. For example, in an EC 10/16 configuration, 6 additional symbols (the variable m) are added to 10 original symbols (the variable k). The 16 data fragments (the variable n) can be spread across 16 drivers, nodes, or geographic locations. The original file can be reconstructed from 10 verified segments. That is, even if six drivers, nodes, or geographic locations are lost or unavailable, the original file can still be restored. Therefore, EC only needs a relatively small amount of data redundancy to achieve data restoration.

In an embodiment of this specification, based on EC, proposed data is divided into data blocks corresponding to backup consensus nodes and subsequently stored on the backup consensus nodes.

Step S104: The primary consensus node sends a first data block of the plurality of data blocks to a corresponding backup consensus node of the plurality of backup consensus nodes in the consortium blockchain.

The multiple data blocks obtained by dividing the proposed data may correspond one-to-one to the backup consensus nodes of the consortium blockchain. Alternatively, the number of the data blocks obtained by dividing the proposed data is less than the number of the backup consensus nodes of the consortium blockchain, and one backup consensus node corresponds to at most one data block. Therefore, in this step, the primary consensus node can, but does not necessarily, send a data block to each backup consensus node of the consortium blockchain, which depends on EC algorithm settings.

Step S106: The backup consensus node receiving the first data block sent by the primary consensus node forwards the received first data block to one or more other backup consensus nodes of the consortium blockchain.

It should be understood that the backup consensus nodes forward received data blocks to each other in this step. Normally, any backup consensus node obtaining N-F data blocks can restore complete proposed data, where F is a fault tolerance of the EC algorithm.

Step S108: The primary consensus node initiates a consensus process of the proposed data based on a PBFT protocol to send a hash value of first the data block obtained by dividing the proposed data to the corresponding backup consensus node of the consortium blockchain via a PBFT protocol message.

It should be understood that, in order to prevent misbehavior of the primary consensus node, the backup consensus nodes need to perform a verification on proposed data sent by the primary consensus node to ensure that each primary consensus node can obtain correct proposed data.

In an embodiment of this specification, the primary consensus node needs to send the hash value of a data block to the corresponding backup consensus node. This way, the corresponding backup consensus node can perform a verification on the received data block using the EC algorithm and based on the hash value of the data block sent by the primary consensus node to determine whether correct proposed data have been obtained.

Step S110: The corresponding backup consensus node of the consortium blockchain performs, based on the hash value of the first data block in the PBFT protocol message, a verification on the first data block obtained by dividing the proposed data to execute a consensus logic of the PBFT protocol on successfully verified proposed data.

Specifically, in this step, the corresponding backup consensus node uses the EC technology to reconstruct a Merkle tree for the first data block obtained by dividing the proposed data. If a root hash value of the reconstructed Merkle tree matches the hash value of the first data block in the PBFT protocol message, the verification succeeds, otherwise, the verification fails. If the verification fails, the corresponding backup consensus node can reject the consensus this time.

In practice, if the corresponding backup consensus node performs a verification on the first data block and the verification fails, the corresponding backup consensus node may obtain, from one or more backup consensus nodes, one or more data blocks of the proposed data successfully verified by the one or more other backup consensus nodes. After obtaining the one or more other data blocks successfully, the corresponding backup consensus node can execute the consensus logic of the PBFT protocol on the proposed data. If the backup consensus node fails to obtain the one or more other data blocks verified by the one or more other backup consensus nodes, the corresponding backup consensus node initiates a view switching operation to attempt to replace the primary consensus node of the consortium blockchain.

In addition, the corresponding backup consensus node can further associate and record a serial number of a view of the consensus and a verification result of the proposed data, thereby subsequently tracing back a consensus success rate of the primary consensus node to evaluate the primary consensus node.

Based on the consensus method in FIG. 1, the primary consensus node of the consortium blockchain can send the proposed data using the EC technology to achieve fault tolerance of the proposed data with relatively low network bandwidth and storage space overheads. In addition, the backup consensus node may perform a verification on the received data block based on EC to determine whether correct proposed data is obtained, thereby avoiding subsequent resource consumption for executing the consensus logic on incorrect proposed data. Doing so can prevent the proposed data from being maliciously tampered with and uploaded to the consortium blockchain and significantly improves the consensus efficiency.

The consensus method in this embodiment of this specification is described below in detail.

Application Scenario 1

In application scenario 1, a blockchain uses a PBFT consensus protocol. In each round of view, only a primary consensus node can initiate a consensus process. A specific consensus process includes the following:

The primary consensus node generates proposed data of a current round of view. The proposed data includes a transaction from a transaction pool of the primary consensus node. It should be understood that, in a consortium blockchain system, after a client initiates a transaction and the primary consensus node receives the transaction, the primary consensus node can perform account validity verification on the transaction initiated by the client, and synchronize a transaction that succeeds in account validity verification to the transaction pool of the primary consensus node.

The primary consensus node divides, based on EC technology, proposed data into data blocks corresponding to a plurality of backup consensus nodes, and sends the data blocks obtained through division to the corresponding backup consensus nodes.

A backup consensus node receiving a data block sent by the primary consensus node forwards the received data block to a corresponding backup consensus node of the consortium blockchain.

The primary consensus node initiates a consensus process of the current round of view. A consensus process of the PBFT protocol includes the following:

Pre-Prepare Phase:

The primary consensus node receives a request from a client and assigns an ID (identification number) to the request. The primary consensus node broadcasts a pre-prepare message to the backup consensus nodes. The pre-prepare message includes a view of the current consensus and a digest of the primary consensus node. In addition, the pre-prepare message further includes hash values corresponding to the data blocks and calculated based on EC by the primary consensus node.

After receiving the pre-prepare message, each backup consensus node determines whether to agree with the ID assigned to the request by the primary consensus node, i.e., confirms whether to accept the pre-prepare message.

If each backup consensus node accepts the pre-prepare message, the each backup consensus node reconstructs, based on EC, a Merkle tree for the obtained data block obtained by dividing the proposed data, and verifies whether a root hash value of the reconstructed Merkle tree matches the hash value of the data block provided in the pre-prepare message by the primary consensus node.

If the root hash value of the reconstructed Merkle tree matches the hash value of the data block provided in the pre-prepare message by the primary consensus node, the verification succeeds, and the process proceeds to a prepare phase.

If the root hash value of the reconstructed Merkle tree does not match the hash value of the data block provided in the pre-prepare message by the primary consensus node, the each backup consensus node attempts to obtain, from the backup consensus nodes, data blocks of the proposed data successfully verified by other backup consensus nodes. If the data blocks are obtained successfully, the process proceeds to the prepare phase. Otherwise, the proposed data of the consensus are returned, and the consensus process ends.

Prepare Phase:

After receiving the pre-prepare message, each backup consensus node participating in the consensus checks whether the pre-prepare message is valid. If the pre-prepare message is valid, the state of the consensus proposal on a replica is determined to be prepared, and the backup consensus node adds the pre-prepare message to a local log and sends a prepare message to another backup consensus node participating in the consensus.

Commit Phase:

After entering the prepared state, each consensus node sends a commit message to another consensus node and adds a commit message sent by the consensus node itself to a local log (i.e., approval of the consensus node itself). When a consensus node finds that a quorum (quorum is a set of a certain number of replicas required to ensure data consistency requirements and fault tolerance requirements of all replica data) agrees with the ID assignment, the consensus node broadcasts a commit message to all other nodes. At the same time, the consensus node also continues to receive commit messages from the other nodes. If each node receives 2f+1 (f is a number of malicious nodes in the consortium blockchain) commit messages (including a message from the consensus node itself, and the commit messages from different nodes carrying the same ID n and the same view v), it indicates that the consensus node has a certificate named committed certificate, and the request is in the committed state on the consensus node. In this case, by using only one consensus node, it can be determined that the request has reached the prepared state in a quorum. All consensus nodes in the same quorum have agreed to the assignment of the ID n. If the request initiated by the client has reached the committed state, it indicates that a consensus in the entire network has been reached.

Application Scenario 2

In application scenario 2, a blockchain uses a PBFT consensus protocol. In each round of views, only a primary consensus node can initiate a consensus process. A specific consensus process includes the followings:

The primary consensus node generates proposed data of a current round of view. The proposed data includes a transaction from a transaction pool of the primary consensus node.

The primary consensus node divides, based on EC technology, proposed data into data blocks corresponding to backup consensus nodes, and sends the data blocks obtained through the division to the corresponding backup consensus nodes.

A backup consensus node receiving a data block sent by the primary consensus node forwards the received data block to a corresponding backup consensus node of the consortium blockchain.

The primary consensus node initiates a consensus process of the current round of view. A consensus process of the PBFT protocol includes the following phases.

Pre-Prepare Phase:

The primary consensus node receives a request from a client, assigns an ID to the request, and broadcasts a pre-prepare message to the backup consensus nodes. The pre-prepare message includes a view of the current consensus and a digest of the primary consensus node. In addition, the pre-prepare message further includes hash values corresponding to the data blocks and calculated based on EC by the primary consensus node.

After receiving the pre-prepare message, each backup consensus node determines whether to agree to the ID n assigned to the request by the primary consensus node, i.e., determines whether to accept the pre-prepare message. After each backup consensus node accepts the pre-prepare message, the process proceeds to a prepare phase.

Prepare Phase:

After receiving the pre-prepare message, each backup consensus node participating in the consensus reconstructs, based on EC, a Merkle tree for a data block obtained by dividing the proposed data, and verifies whether a root hash value of the reconstructed Merkle tree matches the hash value of the data block provided in the pre-prepare message by the primary consensus node.

If the root hash value of the reconstructed Merkle tree matches the hash value of the data block provided in the pre-prepare message by the primary consensus node, the verification succeeds. Then the backup consensus node checks whether the pre-prepare message is valid. If the pre-prepare message is valid, the state of the consensus proposal on a replica is determined as prepared, and the backup consensus node adds the pre-prepare message to a local log and sends the prepare message to another backup consensus node to wait to enter a commit phase.

If the root hash value of the reconstructed Merkle tree does not match the hash value of the data block provided in the pre-prepare message by the primary consensus node, each backup consensus node attempts to obtain, from other backup consensus nodes, other data blocks of the proposed data verified by the other backup consensus nodes. If the other data blocks are obtained successfully, the backup consensus node then checks whether the pre-prepare message is valid. Similarly, if the pre-prepare message is valid, the state of the consensus proposal on a replica is determined as prepared, and the backup consensus node adds the pre-prepare message to a local log and sends the prepare message to another backup consensus node to wait to enter the commit phase. If the other data blocks are not obtained successfully, the backup consensus node returns the proposed data of the consensus and the consensus process ends.

Commit Phase:

After entering the prepared state, each consensus node sends a commit message to other consensus nodes and adds the commit message sent by the consensus node to a local log. When a consensus node finds that a quorum agrees to the ID assignment, the consensus node broadcasts a commit message to all other nodes. At the same time, the consensus node also continues to receive commit messages from the other nodes. If each node receives 2f+1 commit messages, it indicates that the consensus node has a certificate named committed certificate, and the request has reached a committed state on the consensus node. In this case, the request is determined to be in a prepared state in a quorum by using only one consensus node. That is, all consensus nodes in the same quorum agree to the ID assignment n. If a request initiated by the client has reached the committed state, it indicates that a consensus in the entire network has been reached.

Through the above application scenario 1 and application scenario 2, it can be learned that, in a conventional consensus process of a PBFT algorithm, the backup consensus node starts to execute a main consensus logic in the prepare phase. Therefore, in this embodiment of this specification, the backup consensus node performs a verification on the proposed data in the prepare phase or the pre-prepare phase based on the hash value of the data block provided in the pre-prepare message by the primary consensus node. Once the proposed data fails the verification, the subsequent consensus logic is refused to be executed, thereby avoiding unnecessary resource overheads and improving the consensus's execution efficiency.

The method according to the embodiments of this specification is described above. It should be understood that appropriate changes can further be made without departing from the above principles herein, and these changes should also be regarded as the protection scope of the embodiments of this specification.

Figure 2:
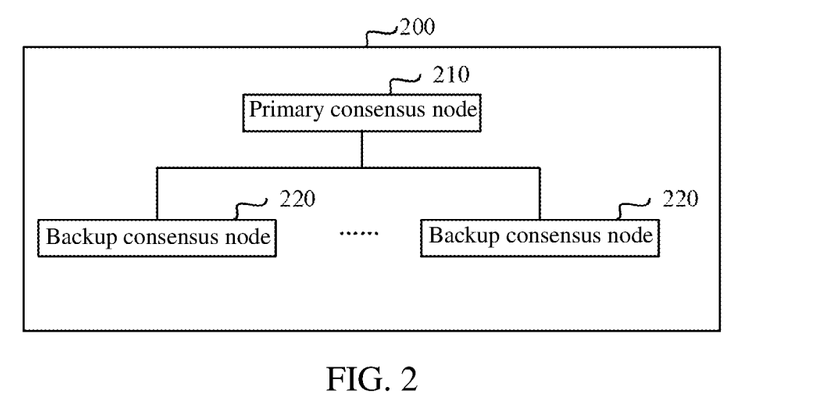
FIG. 2 illustrates a schematic structural diagram of a consortium blockchain system, in accordance with an embodiment of the disclosure.

Corresponding to the above consensus method as shown in FIG. 2, an embodiment of this specification further provides a consortium blockchain system 200, including a primary consensus node 210 and a plurality of backup consensus nodes 220.

Based on EC technology, the primary consensus node 210 divides proposed data into data blocks corresponding to backup consensus nodes 220. The data blocks obtained by dividing the proposed data correspond to hash values calculated based on EC.

The primary consensus node 210 sends the data blocks obtained by dividing the proposed data to the backup consensus nodes 220.

After receiving a data block sent by the primary consensus node 210, a backup consensus node 220 of the consortium blockchain forwards the data block to another backup consensus node 220 of the consortium blockchain.

The primary consensus node 210 initiates a consensus process of the proposed data based on a PBFT protocol to send the hash value of the data block obtained by dividing the proposed data to the backup consensus node 220 by using a PBFT protocol message.

The backup consensus node 220 of the consortium blockchain performs, based on the hash value of the data block in the PBFT protocol message, a verification on the data block obtained by dividing the proposed data, to execute a consensus logic of the PBFT protocol on the verified proposed data.

In the consortium blockchain system in this embodiment, the primary consensus node sends the proposed data by using the EC technology to achieve fault tolerance of the proposed data with relatively low network bandwidth and storage space overheads. In addition, the backup consensus node may perform a verification on the received data block based on EC, to determine whether correct proposed data is obtained. Doing so can avoid subsequent resource consumption for executing the consensus logic on incorrect proposed data, which prevents the proposed data from being maliciously tampered with and then being uploaded to the consortium blockchain, and significantly improves the consensus efficiency.

Optionally, the primary consensus node 210 sends a root hash value of the data block obtained by dividing the proposed data to the backup consensus node 220 of the consortium blockchain by using a pre-prepare message in a pre-prepare phase of the PBFT protocol.

Optionally, the backup consensus node 220 performs, based on the hash value of the data block in the pre-prepare message in the pre-prepare phase or a prepare phase of the PBFT protocol, a verification on the obtained data block obtained by dividing the proposed data.

Optionally, suppose the backup consensus node 220 performs a verification on the obtained data block obtained by dividing the proposed data and fails. In that case, the backup consensus node 220 obtains, from other backup consensus nodes 220, other data blocks of the proposed data verified by the other backup consensus nodes 220, and executes the consensus logic of the PBFT protocol on the proposed data after the data block is obtained successfully.

In addition, based on the above, if the backup consensus node 220 fails to obtain the data block of the proposed data verified by the other backup consensus nodes 220, the backup consensus node 220 initiates a view switching operation.

Optionally, the backup consensus node 220 reconstructs, based on EC, a Merkle tree for the obtained data block obtained by dividing the proposed data. If a root hash value of the reconstructed Merkle tree matches the hash value of the data block in the PBFT protocol message, the verification succeeds; otherwise, the verification fails.

Optionally, the data blocks obtained by dividing the proposed data correspond one-to-one to the backup consensus nodes 220 of the consortium blockchain. Alternatively, the number of data blocks obtained by dividing the proposed data is less than the number of the backup consensus nodes 220 of the consortium blockchain, and one backup consensus node 220 corresponds at most to one data block.

Optionally, the proposed data includes a transaction from a transaction pool of the primary consensus node 210. The primary consensus node 210 performs account validity verification on a transaction initiated by a client and synchronizes a transaction that succeeds in account validity verification to the transaction pool of the primary consensus node.

Optionally, the backup consensus node of the consortium blockchain associates and records a serial number of a view of the consensus and a verification result of the proposed data and subsequently traces back consensus success rate of the primary consensus node to evaluate the primary consensus node.

The consortium blockchain system in this embodiment of this specification can be a performing body for the consensus method in FIG. 1 and thus can implement functions performed in the consensus method in FIG. 1. The principles of the consortium blockchain system and the consensus method are the same, so this specification does not get into details to describe the consortium blockchain system.

Figure 3:
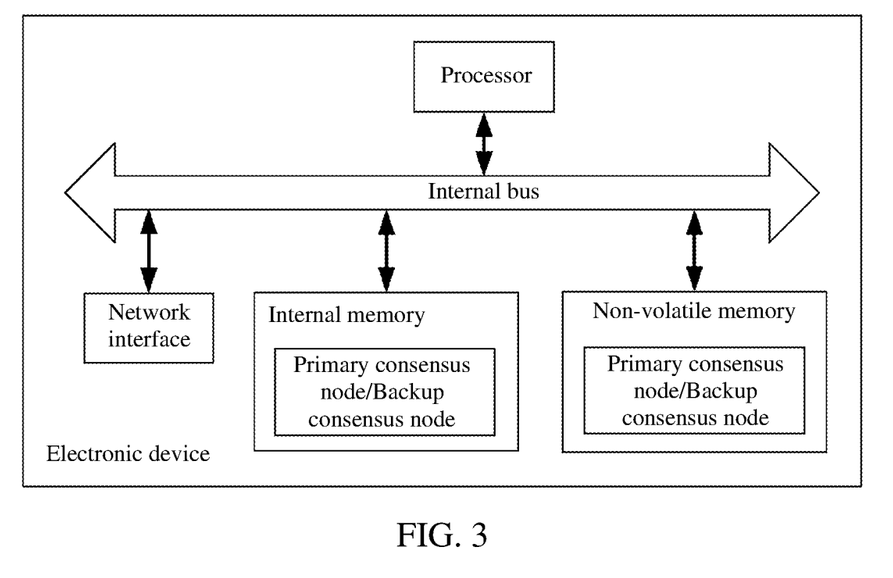
FIG. 3 illustrates a schematic structural diagram of an electronic device, in accordance with an embodiment of the disclosure.

FIG. 3 is a schematic structural diagram of an electronic device according to an embodiment of this specification. Referring to FIG. 3, in terms of hardware, the electronic device includes a processor, and optionally further includes an internal bus, a network interface, and a memory. The memory may include an internal memory, such as a high-speed random access memory (RAM), and may further include a non-volatile memory, such as at least one disk storage. Definitely, the electronic device may further include hardware required for other services.

The processor, the network interface, and the memory may be connected to each other by using the internal bus. The internal bus may be an industry standard architecture (ISA) bus, a peripheral component interconnect (PCI) bus, an extended industry standard architecture (EISA) bus, or the like. The bus may be classified as an address bus, a data bus, a control bus, or the like. For ease of indication, only one bidirectional arrow is used for indication in FIG. 3, but it does not mean that there is only one bus or one type of bus.

The memory is configured to store a program. The program may include program code, and the program code includes a computer operating instruction. The memory may include a memory and a non-volatile memory and provide an instruction and data to the processor.

The processor reads a corresponding computer program from the non-volatile memory to the memory and then runs the computer program, to logically form the above primary consensus node or backup consensus node in the consortium blockchain. The processor executes the program stored in the memory to perform the following operations:

1) if the electronic device is applied to a primary consensus node of a consortium blockchain, dividing, based on EC technology, proposed data into data blocks corresponding to backup consensus nodes of the consortium blockchain, where the data blocks obtained by dividing the proposed data correspond to hash values calculated based on EC; sending the data blocks obtained by dividing the proposed data to corresponding backup consensus nodes in the consortium blockchain; and initiating a consensus process of the proposed data based on a PBFT protocol to send a hash value of a data block obtained by dividing the proposed data to a backup consensus node of the consortium blockchain via a PBFT protocol message; and 2) if the electronic device is applied to a backup consensus node of the consortium blockchain, forwarding the received data block sent by the primary consensus node to other backup consensus nodes of the consortium blockchain; and performing, based on the hash value of the data block in the PBFT protocol message, a verification on the obtained data block obtained by dividing the proposed data, to execute a consensus logic of the PBFT protocol on the successfully verified proposed data.

Based on the electronic device in this embodiment of this specification, the primary consensus node of the consortium blockchain sends proposed data by using the EC technology to achieve fault tolerance of the proposed data with relatively low network bandwidth and storage space overheads. In addition, the backup consensus node may perform a verification on the received data block based on EC to determine whether correct proposed data is obtained. As a result, it can avoid subsequent resource consumption for executing the consensus logic on wrong proposed data, which prevents the proposed data from being maliciously tampered with and then being uploaded to the consortium blockchain, and significantly improves the consensus efficiency.

The above consensus method disclosed in FIG. 1 may be applied to a processor or implemented by a processor. For example, the processor may be an integrated circuit chip with signal processing capabilities. During implementation, each step of the above method can be implemented through the processor's integrated logic circuit hardware or instructions in software. The processor may be a general-purpose processor, such as a central processing unit (CPU), a network processor (NP), or the like. It may also be a digital signal processor (DSP), an application-specific integrated circuit (ASIC), a field-programmable gate array (FPGA), or other programmable logic devices, a discrete gate, a transistor logic device, or a discrete hardware component. The processor can implement the methods, steps, and logical block diagrams disclosed in the embodiments of this specification. The general-purpose processor may be a microprocessor, any conventional processor, or the like. The steps of the method disclosed in this specification may be directly performed by a hardware decoding processor or a combination of hardware and software modules in the decoding processor. The software module may be stored in a storage medium well known in the art, such as a RAM, a flash memory, a read-only memory (ROM), a programmable ROM, an electrically erasable programmable memory, or a register. The processor reads the information in the memory and implements the method in combination with its hardware.

It should be understood that the electronic device, according to this embodiment of this specification, can implement the functions of the consensus method in FIG. 1. Thus, details are not repeated herein.

In addition to the software implementation, the electronic device does not exclude other implementations, such as a logic device, a combination of software and hardware, or the like. In other words, the main execution body for performing the following processing flow is not limited to logic units and maybe hardware or a logic device.

In addition, an embodiment of this specification further discloses a computer-readable storage medium storing one or more programs including instructions. When the instructions are executed by a portable electronic device including multiple application programs, the portable electronic device can perform the method of FIG. 1 and can be specifically configured to perform the following method:

1) if the electronic device is applied to a primary consensus node of a consortium blockchain, dividing, based on EC technology, proposed data into data blocks corresponding to backup consensus nodes of the consortium blockchain, where the data blocks obtained by dividing the proposed data correspond to hash values calculated based on EC; sending the data blocks obtained by dividing the proposed data to corresponding backup consensus nodes in the consortium blockchain; and initiating a consensus process of the proposed data based on a PBFT protocol to send a hash value of a data block obtained by dividing the proposed data to a backup consensus node of the consortium blockchain via a PBFT protocol message; and 2) if the electronic device is applied to a backup consensus node of the consortium blockchain, forwarding the received data block sent by the primary consensus node to one or more other backup consensus nodes of the consortium blockchain; and performing, based on the hash value of the data block in the PBFT protocol message, a verification on the obtained data block obtained by dividing the proposed data, to execute a consensus logic of the PBFT protocol on the successfully verified proposed data.

A person skilled in the art should understand that the embodiments of this specification may be provided as a method, a system, or a computer program product. Therefore, this specification may use a form of hardware-only embodiments, software-only embodiments, or embodiments with a combination of software and hardware. Moreover, this specification may use a form of a computer program product that is implemented on one or more computer-usable storage media (including but not limited to a disk memory, a CD-ROM, an optical memory, and the like) that include computer-usable program code.

Specific embodiments of this specification are described above. Other embodiments fall within the scope of the appended claims. In some cases, the actions or steps described in the claims may be performed in sequences different from those in the embodiments, and still achieve desired results. In addition, the processes depicted in the accompanying drawings are not necessarily performed in the specific order or successively to achieve the desired result. In some implementations, multitasking and parallel processing may be feasible or beneficial.

The above descriptions are merely embodiments of this specification and do not intend to limit this specification. For a person skilled in the art, various modifications and changes may be made to this specification. Any modifications, equivalent replacements, and improvements made within the spirit and principle of this specification shall fall within the scope of the claims of this specification. In addition, all other embodiments obtained by a person of ordinary skill in the art without creative efforts shall fall within the protection scope of this specification.

What is claimed is:

1. A consensus method of a consortium blockchain, comprising:
   dividing, by a primary consensus node of the consortium blockchain, proposed data into a plurality of data blocks corresponding to a plurality of backup consensus nodes of the consortium blockchain based on erasure coding (EC), wherein the plurality of data blocks correspond to hash values calculated based on EC;
   sending, by the primary consensus node, a first data block of the plurality of data blocks to a corresponding backup consensus node of the plurality of backup consensus nodes, wherein the first data block is forwarded by the corresponding backup consensus node receiving the first data block to one or more other backup consensus nodes of the plurality of backup consensus nodes; and
   initiating, by the primary consensus node, a consensus process for the proposed data based on a Practical Byzantine Fault Tolerance (PBFT) protocol to send a hash value of the first data block to the corresponding backup consensus node via a PBFT protocol message, wherein:
      a verification on the first data block is performed by the corresponding backup consensus node, based on the hash value of the first data block in the PBFT protocol message, to execute a consensus logic of the PBFT protocol on successfully verified proposed data, and
      in response to the verification on the first data block failing:
         one or more other data blocks of the proposed data verified by one or more other backup consensus nodes of the consortium blockchain is obtained by the corresponding backup consensus node of the consortium blockchain from the one or more other backup consensus nodes, and
         the consensus logic of the PBFT protocol is executed on the proposed data in response to the one or more other data blocks being obtained successfully.

2. The method of claim 1, wherein:
   the primary consensus node sends a root hash value of the first data block to the corresponding backup consensus node of the consortium blockchain via a pre-prepare message in a pre-prepare phase of the PBFT protocol.

3. The method of claim 2, wherein the verification on the obtained first data block is performed based on the hash value of the first data block in the pre-prepare message in the pre-prepare phase or a prepare phase of the PBFT protocol.

4. The method of claim 1, wherein:
   in response to the corresponding backup consensus node failing to obtain the one or more other data blocks verified by the one or more other backup consensus nodes, a view switching operation is initiated by the corresponding backup consensus node.

5. The method of claim 1, wherein the verification on the first data block is performed by:
   reconstructing, based on EC, a Merkle tree for the first data block; and
   in response to a root hash value of the reconstructed Merkle tree matching the hash value of the first data block in the PBFT protocol message, determining that the verification succeeds, otherwise, determining that the verification fails.

6. The method of claim 1, wherein:
   the plurality of data blocks obtained by dividing the proposed data correspond one-to-one to the plurality of backup consensus nodes of the consortium blockchain; or
   a number of the plurality of data blocks obtained by dividing the proposed data is less than a number of the plurality of backup consensus nodes of the consortium blockchain, and one backup consensus node corresponds at most to one data block.

7. The method of claim 1, wherein:
   the proposed data comprises one or more transactions from a transaction pool of the primary consensus node, and the primary consensus node performs an account validity verification on a transaction initiated by a client and synchronizes a transaction having succeeded in the account validity verification to the transaction pool of the primary consensus node.

8. The method of claim 1, further comprising:
   recording, by the corresponding backup consensus node of the consortium blockchain, a serial number of a view of the consensus and a verification result of the proposed data in association with each other.

9. A system for consensus in a consortium blockchain, comprising:
   at least one processor; and
   a memory storing instructions that, when executed by the at least one processor, cause the system to perform operations comprising:
      dividing, by a primary consensus node of the consortium blockchain, proposed data into a plurality of data blocks corresponding to a plurality of backup consensus nodes of the consortium blockchain based on erasure coding (EC), wherein the plurality of data blocks correspond to hash values calculated based on EC;

sending, by the primary consensus node, a first data block of the plurality of data blocks to a corresponding backup consensus node of the plurality of backup consensus nodes, wherein the first data block is forwarded by the corresponding backup consensus node receiving the first data block to another backup consensus node of the plurality of backup consensus nodes; and initiating, by the primary consensus node, a consensus process of the proposed data based on a Practical Byzantine Fault Tolerance (PBFT) protocol to send a hash value of the first data block to the corresponding backup consensus node via a PBFT protocol message, wherein:

a verification on the first data block is performed by the corresponding backup consensus node, based on the hash value of the first data block in the PBFT protocol message, to execute a consensus logic of the PBFT protocol on successfully verified proposed data, and in response to the verification on the first data block failing:

one or more other data blocks of the proposed data verified by one or more other backup consensus nodes of the consortium blockchain is obtained by the corresponding backup consensus node of the consortium blockchain from the one or more other backup consensus nodes, and the consensus logic of the PBFT protocol is executed on the proposed data in response to the one or more other data blocks being obtained successfully.

10. The system of claim 9, wherein:
the primary consensus node sends a root hash value of the first data block to the corresponding backup consensus node of the consortium blockchain via a pre-prepare message in a pre-prepare phase of the PBFT protocol.

11. The system of claim 10, wherein the verification on the obtained first data block is performed based on the hash value of the first data block in the pre-prepare message in the pre-prepare phase or a prepare phase of the PBFT protocol.

12. The system of claim 9, wherein:
in response to the corresponding backup consensus node failing to obtain the one or more data blocks verified by the one or more backup consensus nodes, a view switching operation is initiated by the corresponding backup consensus node.

13. The system of claim 9, wherein the verification on the first data block is performed by:
reconstructing, based on EC, a Merkle tree for the first data block obtained by dividing the proposed data; and
in response to a root hash value of the reconstructed Merkle tree matching the hash value of the data block in the PBFT protocol message, determining that the verification succeeds, otherwise, determining that the verification fails.

14. The system of claim 9, wherein:
the plurality of data blocks obtained by dividing the proposed data correspond one-to-one to the plurality of backup consensus nodes of the consortium blockchain; or
a number of the plurality of data blocks obtained by dividing the proposed data is less than a number of the plurality of backup consensus nodes of the consortium blockchain, and one backup consensus node corresponds at most to one data block.

15. The system of claim 9, wherein:
the proposed data comprises one or more transactions from a transaction pool of the primary consensus node, wherein the primary consensus node performs an account validity verification on a transaction initiated by a client and synchronizes a transaction having succeeded in the account validity verification to the transaction pool of the primary consensus node.

16. The system of claim 9, further comprising:
recording, by the corresponding backup consensus node of the consortium blockchain, a serial number of a view of the consensus and a verification result of the proposed data in association with each other.

17. A non-transitory computer-readable storage medium including instructions that, when executed by at least one processor of a computing system, cause the computing system to perform operations comprising:

dividing, by a primary consensus node of the consortium blockchain, proposed data into a plurality of data blocks corresponding to a plurality of backup consensus nodes of the consortium blockchain based on erasure coding (EC), wherein the plurality of data blocks correspond to hash values calculated based on EC;

sending, by the primary consensus node, a first data block of the plurality of data blocks to a corresponding backup consensus node of the plurality of backup consensus nodes, wherein the first data block is forwarded by the corresponding backup consensus node receiving the first data block to another backup consensus node of the plurality of backup consensus nodes;

initiating, by the primary consensus node, a consensus process of the proposed data based on a Practical Byzantine Fault Tolerance (PBFT) protocol to send a hash value of the data block to the corresponding backup consensus node via a PBFT protocol message, wherein:

a verification on the data block is performed by the corresponding backup consensus node, based on the hash value of the data block in the PBFT protocol message, to execute a consensus logic of the PBFT protocol on successfully verified proposed data; and recording, by the corresponding backup consensus node of the consortium blockchain, a serial number of a view of the consensus and a verification result of the proposed data in association with each other.

18. The non-transitory computer-readable storage medium of claim 17, wherein
the primary consensus node sends a root hash value of the data block to the corresponding backup consensus node of the consortium blockchain via a pre-prepare message in a pre-prepare phase of the PBFT protocol.

19. A consensus method of a consortium blockchain, comprising:

dividing, by a primary consensus node of the consortium blockchain, proposed data into a plurality of data blocks corresponding to a plurality of backup consensus nodes of the consortium blockchain based on erasure coding (EC), wherein the plurality of data blocks correspond to hash values calculated based on EC;

sending, by the primary consensus node, a first data block of the plurality of data blocks to a corresponding backup consensus node of the plurality of backup consensus nodes, wherein the first data block is forwarded by the corresponding backup consensus node receiving the first data block to one or more other backup consensus nodes of the plurality of backup consensus nodes; and initiating, by the primary consensus node, a consensus process for the proposed data based on a Practical Byzantine Fault Tolerance (PBFT) protocol to send a hash value of the first data block to the corresponding backup consensus node via a PBFT protocol message, wherein:
- a verification on the first data block is performed by the corresponding backup consensus node, based on the hash value of the first data block in the PBFT protocol message, to execute a consensus logic of the PBFT protocol on successfully verified proposed data, and
- the proposed data comprises one or more transactions from a transaction pool of the primary consensus node, and the primary consensus node performs an account validity verification on a transaction initiated by a client and synchronizes a transaction having succeeded in the account validity verification to the transaction pool of the primary consensus node.

20. A system for consensus in a consortium blockchain, comprising:
- at least one processor; and
- a memory storing instructions that, when executed by the at least one processor, cause the system to perform operations comprising:
  - dividing, by a primary consensus node of the consortium blockchain, proposed data into a plurality of data blocks corresponding to a plurality of backup consensus nodes of the consortium blockchain based on erasure coding (EC), wherein the plurality of data blocks correspond to hash values calculated based on EC;
  - sending, by the primary consensus node, a first data block of the plurality of data blocks to a corresponding backup consensus node of the plurality of backup consensus nodes, wherein the first data block is forwarded by the corresponding backup consensus node receiving the first data block to another backup consensus node of the plurality of backup consensus nodes; and
  - initiating, by the primary consensus node, a consensus process of the proposed data based on a Practical Byzantine Fault Tolerance (PBFT) protocol to send a hash value of the first data block to the corresponding backup consensus node via a PBFT protocol message, wherein:
    - a verification on the first data block is performed by the corresponding backup consensus node, based on the hash value of the first data block in the PBFT protocol message, to execute a consensus logic of the PBFT protocol on successfully verified proposed data, and
    - the proposed data comprises one or more transactions from a transaction pool of the primary consensus node, and the primary consensus node performs an account validity verification on a transaction initiated by a client and synchronizes a transaction having succeeded in the account validity verification to the transaction pool of the primary consensus node.

* * * * *

UNITED STATES PATENT AND TRADEMARK OFFICE
CERTIFICATE OF CORRECTION

PATENT NO. : 11,368,317 B2
APPLICATION NO. : 17/359581
DATED : June 21, 2022
INVENTOR(S) : Shuai Li It is certified that error appears in the above-identified patent and that said Letters Patent is hereby corrected as shown below:

On the Title Page (71) Applicant's city "Zhejiang" should read -- Hangzhou --.

Signed and Sealed this
Thirtieth Day of August, 2022

Katherine Kelly Vidal
*Director of the United States Patent and Trademark Office*